United States Patent Office

3,429,829
Patented Feb. 25, 1969

3,429,829
ORGANOLITHIUM INITIATOR PLUS HALOGEN AND HALOGEN CONTAINING COMPOUND ADJUVANTS FOR THE PREPARATION OF DIENE POLYMERS
Gerald R. Kahle, Bartlesville, Okla., assignor to Phillips Petroleum Company, a corporation of Delaware
No Drawing. Continuation-in-part of application Ser. No. 450,172, Apr. 22, 1965, which is a division of application Ser. No. 137,015, Sept. 11, 1961. This application Oct. 14, 1966, Ser. No. 586,621
U.S. Cl. 252—431                                         6 Claims
Int. Cl. C08d 1/14; C08f 1/28

ABSTRACT OF THE DISCLOSURE

A catalyst composition for polymerizing monomers such as isoprene, the composition being formed on mixing an organolithium compound and a halogen containing compound.

---

This is a continuation-in-part of application Ser. No. 450,172, filed Apr. 22, 1965, now abandoned which in turn is a division of application Ser. No. 137,015, filed Sept. 11, 1961, now abandoned.

This invention relates to the polymerization of conjugated dienes to form rubbery polymeric products of improved properties. In accordance with one aspect, this invention relates to an improved process for producing diene polymers having a high percentage of cis-1,4-addition. In another aspect, this invention relates to a high cis-polyisoprene which can be readily processed. In another aspect this invention relates to an improved catalyst composition.

In recent years, there has been a great deal of activity in the development of processes for producing olefin polymers. Polymers of monoolefins, such as ethylene and propylene, prepared by these processes, have received wide acceptance by many industries. The more recent discovery in the field of diene polymerization of certain so-called stereospecific catalysts, which make possible the formation of polymers having a desired configuration, has aroused considerable interest. The polymers formed by the use of these catalysts often have outstanding physical properties which render them equal to or even superior to natural rubber.

While diene polymers can be produced in the presence of organolithium initiators, the products frequently have a higher inherent viscosity than desired and are also difficult to process, i.e., extrusion rates are low, the edges of the extrudate are rough, and the polymers tend to be baggy and crumbly on the mill.

The present invention is concerned with an improved process for preparing readily processable diene polymers, especially diene polymers containing a high percentage of cis-1,4-addition. The present invention also is concerned with a catalyst composition for the improved process for preparing readily processable diene polymers.

Accordingly, an object of this invention is to provide an improved process for producing rubbery polymers of conjugated dienes.

Another object of this invention is to improve the processing properties or characteristics of diene polymers.

Another object of this invention is to provide an improved catalyst composition.

Another object of this invention is to provide an improved process for polymerizing isoprene so as to produce a rubbery polymer which contains a high percentage of cis-1,4-addition and which is readily processable.

Other and further objects and advantages of the invention will become apparent to those skilled in the art upon consideration of the accompanying disclosure and the appended claims.

According to the invention, polymers of conjugated dienes having improved processing properties are formed by contacting the monomer(s) with an organolithium initiator system in the presence of a halogen adjuvant.

It has now been found that if a halogen adjuvant is present when a conjugated diene is polymerized in the presence of an organolithium initiator, certain desirable effects on the properties of the polymer are obtained. For example, isoprene polymers obtained according to the invention, in many instances, have a lower inherent viscosity than otherwise obtained, have better extrusion properties, and exhibit good mill banding. Furthermore, the polyisoprene products obtained have a cis content as high or higher than that of polymers prepared in the absence of a halogen adjuvant. Thus, one notable advantage of the present invention is that the inherent viscosity can be controlled without lowering the cis content. While the present invention is not dependent upon any particular reaction mechanism, the halogen adjuvants employed are regarded as modifiers and processing aids.

It has also been found that high cis-polyisoprene of improved processability characteristics can be formed by polymerizing isoprene with a polylithium initiator in the presence of an organic halogen compound. This aspect of the invention is hereinafter referred to as the organic halide aspect. The polylithium initiator is prepared from polycyclic aromatic compounds, polyaryl substituted ethylenes containing from 2 to 4 aryl groups selected from the group consisting of phenyl and naphthyl and bihalogen-containing polyaryl substituted ethanes. The organic halide is at least one compound selected from the group consisting of saturated aliphatic, saturated cycloaliphatic and aromatic halides, preferably saturated aliphatic halides. It has further been found that alkyllithium initiators do not effect the same results as the above polylithium initiators.

The initiators of this invention are all readily capable of existing outside of the polymerization mixture as will be obvious to any one skilled in the art. For example, the lithium initiators of this invention can be mixed with the halogen adjuvants, be they organic halides, free halogen, and the like, in any conventional manner so that there exists in a separate and distinct state an initiator composition comprising the organolithium compound and the halogen adjuvant compound. The separate and distinct initiator compositions of this invention can be formed by mixing the components in solution and/or dispersed form at any temperature and pressure, a primary result being the formation of a separate mixture of the lithium and halogen components. Any of the innumerable conventional methods suitable for making such a mixture will be quite obvious to those skilled in the art and therefore no more details will be recited here.

According to the invention, the above-described polymerization is carried out in the presence of a halogen adjuvant having a formula selected from the group consisting of (1) $RX_z$, (2) HX and (3) $X_2$, wherein X is a halogen selected from F, Cl, Br and I, z is an integer of 1 to 3, R is a hydrocarbon radical selected from aliphatic, cycloaliphatic and aromatic radicals containing from 1 to 12, inclusive, carbon atoms, when z is 2 or 3, no more than one X is fluorine, and when z is 1 and X is F, R is selected from aliphatic and cycloaliphatic radicals having from 1 to 12, inclusive, carbon atoms.

The organic halogen compounds employed in the organic halide aspect of this invention have the formula RX wherein X is a halogen selected from the group consisting of chlorine, bromine, iodine and fluorine and R is a hydrocarbon radical selected from the group consisting of saturated aliphatic, saturated cycloaliphatic and aromatic radicals containing from 1 to 12 carbon atoms, inclusive, preferably 1 to 9 carbon atoms, inclusive, and combinations thereof.

Representative examples of suitable halogen adjuvants that can be employed according to the invention include fluorine, chlorine, bromine, iodine, hydrogen fluoride, hydrogen chloride, hydrogen bromide, hydrogen iodide, methyl chloride, methyl bromide, methylene bromide, chloroform, bromoform, ethylene bromide, allyl bromide, isopropyl iodide, isobutyl iodide, n-butyl chloride, n-butyl bromide, n-hexyl iodide, n-hexyl fluoride, 2,4,6-trichloro-1-octene, n-dodecyl chloride, 1,2,3-tribromopropane, diiodomethane, 1,4-dichloropentane, 1,3,5-triiodopentane, 1,12-dibromo-6-dodecene, 1,5-dibromo-5-fluorononane, 1,3,6-trichloro-2,4-diethylhexane, 1,3,6-trichloro-2,4-diethylhexane, cyclopentyl fluoride, 1,3,5-tribromocyclopentane, cyclohexyl iodide, 4-methylcyclohexyl fluoride, 4-bromocyclohexane, bromobenzene, chlorobenzene, 1,5-dibromo-3,6-diisopropylbenzene, 1,4-dichlorobenzene, 4-iodotoluene, benzyl chloride, and the like. Of the above halogen adjuvants, the n-alkyl bromides are preferred.

The quantity or amount of halogen adjuvant employed during polymerization can vary appreciably and the amount or quantity is generally expressed in terms of the gram atoms of lithium in the initiator per gram atom of halogen in the adjuvant. Generally, the amount of halogen employed is in the range 0.25 to 20 gram atoms of lithium, preferably from 1 to 10 gram atoms of lithium, per gram atom of halogen, but the amount utilized will depend upon the activity of the adjuvant. There is considerable variation in activity and in some instances too large a quantity of the halogen adjuvant destroys the initiator. In such cases only small amounts of adjuvant should be used while in other cases satisfactory results can be obtained with larger amounts.

Broadly, the initiator compositions that can be employed in carrying out the present invention include organolithium compounds. The term "organolithium compounds," as used herein, includes the various lithium hydrocarbons, especially the mono- and polylithium hydrocarbons that are active for the polymerization of conjugated dienes to rubbery polymers. The organolithium compounds that can be employed in the invention ordinarily contain from 1 to 4 lithium atoms per molecule. These organolithium compounds can be prepared in a hydrocarbon or polar medium in several ways, for example, by replacing halogen in an organic halide with lithium or by the direct addition of lithium to a double bond or by reacting an organic halide with a lithium-containing compound.

The hydrocarbons from which the organolithium compounds are prepared generally contain 4 to 30, inclusive, carbon atoms per molecule, and when the parent hydrocarbon is an aromatic hydrocarbon it can contain alkyl substituents. The alkyl substituents can contain from 1 to 6 carbon atoms but the total carbon atoms in each alkyl group should not exceed 6 and no more than 3 alkyl groups should be present per molecule.

The organolithium compounds that can be employed in the organic halide aspect of this invention contain from 2 to 4 lithium atoms per molecule. These organolithium compounds can be prepared in a hydrocarbon or polar medium in several ways, for example, by replacing hydrogen in an organic halide with lithium or by the direct addition of lithium to a double bond or by reacting an organic halide with a lithium-containing compound.

The compounds from which the organolithium initiators for the organic halide aspect of this invention are prepared are polycyclic aromatics, halogen derivatives of polycyclic aromatics containing from 2 to 4 halogen atoms per molecule, polyaryl substituted ethylenes, and bihalogen-containing, i.e. 1,2-dihalo, polyaryl substituted ethanes and generally contain from 10 to 30, inclusive, carbon atoms per molecule. When the parent compound is a polycyclic aromatic compound, it can contain alkyl substituents which substituents can themselves contain from 1 to 6 carbon atoms. The total number of carbon atoms in each alkyl substituent group should not exceed 6 and no more than 3 alkyl groups should be present per molecule.

As indicated above, organolithium compounds which are applicable in this invention include both substitution products and adducts. Substitution products can be both mono- and polylithium compounds depending upon the hydrocarbons from which they are derived and the method of preparation. Methods suitable for the preparation of substitution products include (1) halogen-lithium interconversion, e.g. the reaction of a dichloronaphthalene with butyllithium to produce a dilithionaphthalene and (2) halogen displacement, e.g. the reaction of lithium with 1,4-dichlorobutane to give 1,4-dilithiobutane. Adducts are prepared by the reaction of lithium with the appropriate hydrocarbon wherein the reaction occurs either by 1,2- or by 1,4-addition, depending upon the hydrocarbon employed. Reactions of this type are illustrated by the addition of lithium to naphthalene or to the double bond in stilbene.

Monolithium substitution products can be prepared by reacting lithium or an organolithium compound with halogen-containing mono- and polycyclic aromatic compounds including condensed ring aromatics and polyphenyls. Representative examples of such monolithium initiators include lithiobenzene, 1-lithionaphthalene, 2-lithionaphthalene, 4-lithio-1-methylnaphthalene, 9-lithioanthracene, 9-lithiophenanthrene, 5-lithioacenaphthene, 1-lithio-2,4,6-trimethylbenzene (lithiomesitylene), 1-lithio-2-amylnaphthalene, 1-lithio-4-hexylnaphthalene, 1-lithio-2-ethyl-4-n-butylbenzene, 4 - lithiobiphenyl, 3 - lithio - 3'-n-propylbiphenyl, and 4-lithio-p-terphenyl. Monolithium substitution products can also be obtained by the reaction of lithium with halogen - containing polyaryl - substituted methanes. Representative examples of such initiators include lithiotriphenylmethane, lithiodiphenylmethane, lithio(di-2-naphthyl)methane and lithio(tri-2-naphthyl)methane.

Polylithium substitution products can be obtained by the reaction of lithium or an organolithium compound with mono- and polycyclic aromatic compounds containing two or more halogen atoms per molecule including condensed ring aromatics and polyphenyls. Representative examples of such initiators include 1,4-dilithiobenzene, 4,4'-dilithiobiphenyl, 2,2',2''-trilithio-p-terphenyl, 1,4-dilithionaphthalene, 1,5-dilithionaphthalene, 9,10-dilithioanthracene, 9,10-dilithiophenanthrene, 1,3,5-trilithiobenzene, 1,4-dilithio-2-n-hexylbenzene, 1,3,5-trilithio-2,4, 6-triethylbenzene, 5,6-dilithioacenaphthene, 2,4-dilithio-5,7-diisopropylphenanthrene, 1,4-dilithioanthracene, and 1,4-dilithio-2-methylnaphthalene.

For the organic-halide aspect of this invention polylithium substitution products are preferably obtained using an alkyllithium where the alkyl radical contains from 1 to 6 carbon atoms, inclusive, and a polycyclic aromatic compound containing 2 to 4 halogen atoms per molecule, including condensed ring aromatics and polyphenyl.

Polylithium substitution products can also be obtained from the reaction of lithium with halogen-containing, e.g., bihalogen-containing, polyaryl substituted ethanes. Representative examples of such initiators include 1,2-dilithio - 1,2 - diphenylethane, 1,2 - dilithio-1,1-diphenylethane, 1,2 - dilithiotetraphenylethane, 1,2 - dilithio-1-phenyl - 2 - (1-naphthyl)ethane, and 1,2-dilithio-1,2-di(2-naphthyl)ethane.

Polylithium substitution products can be obtained from the reaction of lithium with halogen-containing saturated aliphatic and cycloaliphatic compounds containing 4 to 12, inclusive, carbon atoms per molecule. Representative lithiobutane, 1,6-dilithiohexane, 1,12-dilithiododecane, 1,4-dilithio-2,4,6-trimethylhexane, 1,4-dilithiocyclohexane, 1,2-dilithio-4-n-hexylcyclohexane, 1,3-dilithio-2,6-diethylcyclohexane, and 1,3-dilithiocyclopentane.

The organolithium initiators employed in carrying out the present invention can also be adducts, which are the reaction products of lithium with polycyclic aromatic compounds or polyaryl substituted ethylenes. The polycyclic aromatic compounds that can be reacted with lithium preferably include condensed ring aromatic compounds such as naphthalene, anthracene and phenanthrene; alkyl substituted condensed ring aromatics in which the alkyl group contains from 1 to 6 carbon atoms such as 1-methylnaphthalene, 2-methylnaphthalene, 1-ethylnaphthalene, 1-n-propylnaphthalene, 1-tert-butylnaphthalene, 2-amylnaphthalene, 2,4-di-n-propylnaphthalene, 9-methylanthracene, 1-ethylanthracene, 1,4,5-triethylanthracene, 2,7-dimethylphenanthrene, and the like, and mixtures of these compounds. The polyaryl substituted ethylenes that can be employed include those compounds which contain 2, 3 or 4 aryl groups such as phenyl and/or naphthyl, for example, 1,1-diphenylethylene, 1,2-diphenylethylene (stilbene), triphenylethylene, tetraphenylethylene, 1-phenyl-1-naphthylethylene, 1,2-dinaphthylethylene, 1,1-diphenyl-2 - naphthylethylene, trinaphthylethylene and the like. Other polycyclic aromatics such as biphenyls, terphenyls and dinaphthyl can also be used.

The lithium employed for preparing the initiators can be used in any form desired, such as wire, chunks or shot, or in a finely divided state. It is preferred that at least equimolar proportions of lithium be used in preparing the initiator reaction products and in many instances an excess of lithium is employed.

The above-described initiators can be conveniently prepared in any manner known in the art. In some instances it is advantageous to react lithium with mixtures of hydrocarbons, e.g. a mixture of naphthalene and anthracene in ether, to facilitate the reaction. Frequently, the initiator is formed in a polar solvent or other organic media. In the interest of obtaining a polymer with as high a cis content as possible, it is preferred that any polar solvent employed in the preparation of the initiator be substantially completely replaced with a suitable hydrocarbon, e.g. a high boiling hydrocarbon such as a mineral oil, before polymerization. Also, it is preferred that the initiator be prepared and that the polymerization be carried out in the presence of an inert atmosphere, such as argon, helium, nitrogen, and the like.

The initiators of this invention are of particular interest for the production of high cis polyisoprene and butadiene homopolymers and copolymers in which the conjugated diene portion has a low vinyl content. The polyisoprene obtained according to the invention has a raw cis content above 65 percent and generally above 70 percent. In general, the polymers which can be prepared according to the invention are those of conjugated dienes containing from 4 to 12 carbon atoms per molecule and preferably those containing from 4 to 8 carbon atoms per molecule.

Representative examples of suitable conjugated dienes that can be employed include 1,3-butadiene,
isoprene,
2,3-dimethyl-1,3-butadiene,
1,3-pentadiene (piperylene),
2-methyl-3-ethyl-1,3-butadiene,
3-methyl-1,3-pentadiene,
2-methyl-3-ethyl-1,3-pentadiene,
2-ethyl-1,3-pentadiene,
1,3-hexadiene,
2-methyl-1,3-hexadiene,
1,3-heptadiene,
3-methyl-1,3-heptadiene,
1,3-octadiene,
3-butyl-1,3-octadiene,
3,4-dimethyl-1,3-hexadiene,
3-n-propyl-1,3-pentadiene,
4,5-diethyl-1,3-octadiene,
2-phenyl-1,3-butadiene,
2,3-diethyl-1,3-butadiene,
2,3-di-n-propyl-1,3-butadiene,
2-methyl-3-isopropyl-1,3-butadiene, and the like.

Conjugated dienes containing halogen and alkoxy substituents along the chain can also be employed, such as chloroprene, fluoroprene, 2-methoxy-1,3 - butadiene, 2-ethoxy-3-ethyl-1,3-butadiene, and 2-ethoxy-3-methyl-1,3-hexadiene.

This invention is applicable to the polymerization of the above-defined conjugated dienes either alone or in admixture with each other and/or with one or more other unsaturated compounds preferably containing an active $CH_2=C<$ group which are copolymerizable therewith. Included among these latter compounds are aliphatic 1-olefins having up to and including 8 carbon atoms per molecule, such as ethylene, propylene, 1-butene, 1-hexene, and 1-octene. Branched chain olefins, such as isobutylene, can be used as well as 1,1-dialkyl-substituted and 1,2-dialkyl-substituted ethylenes, such as butene-2, pentene-2, hexene-2, heptene-2, 2-methylbutene-1, 2-methylhexene-1, 2-methylheptene-1, and the like. Other olefins which can be used include di- and polyolefins such as 1,5-hexadiene, 1,4-pentadiene and 1,4,7-octatriene, and cyclic olefins, such as cyclohexene. Other examples of compounds containing an active $CH_2=C<$ group which are copolymerizable with one or more of the conjugated dienes are styrene, acrylonitrile, methacrylonitrile, methyl acrylate, methyl methacrylate, 5-methyl-2-vinylpyridine, 2-vinylpyridine, 4-vinylpyridine, 3-vinyltoluene, 1-vinylnaphthalene, 2-vinylnaphthalene, 4-vinyltoluene, and the like.

The temperature employed for polymerization according to the invention is generally in the range —100 to 150° C., preferably from —75 to 75° C. The particular temperature employed depends on both the monomer and initiators used in the polymerization. The pressure employed during polymerization need be only that necessary to maintain the materials substantially completely in a liquid phase. The amount of initiator employed during polymerization will vary appreciably, but generally it will be in the range from about 0.1 to about 200 gram atoms of lithium per 100 grams of monomer with the preferred range being from about 0.25 to about 60 gram atoms of lithium per 100 grams of monomer.

The polymerization of monomer in the presence of the halogen adjuvant and organolithium initiators according to the invention is preferably carried out in a suitable diluent such as benzene, toluene, cyclohexane, methylcyclohexane, xylene, n-butane, n-hexane, n-pentane, n-heptane, isooctane, and the like. Generally, the diluent is selected from hydrocarbons, for example, paraffins, cycloparaffins, and aromatics containing from 4 to 10, inclusive, carbon atoms per molecule.

There can be numerous variations in operating procedure when carrying out the polymerization in accordance with the present process. The halogen adjuvant can be charged to the system as a separate ingredient either as such or in solution in a solvent which will not have a deleterious effect on the polymerization. It is convenient to introduce elemental halogen in the form of a solution, particularly when the halogen is bromine or iodine. Halogen acids can be conveniently introduced either as gases or solutions in appropriate solvents. If desired, the adjuvant can be charged to the polymerization as part of the initiator. If the initiator is prepared in a polar solvent, the halogen adjuvant can be added to the solution and the polar solvent then replaced with a suitable hydrocarbon diluent, or the halogen adjuvant can be incorporated into the initiator following replacement with a suitable hydrocarbon diluent.

One of the requirements for the successful polymerization of isoprene in accordance with known processes is that the monomer be of high degree of purity. An advantage of the present process is that it is not essential that olefinic impurities be removed. It has been found, in fact, that excellent results can be achieved by using an isoprene-containing stream as found in the isoamylene effluent from a dehydrogenation operation. The economic advantage of such a process is obvious and the time and cost saved which would ordinarily be required for separation and purification of the isoprene is significant. As is well known, commercially produced isoprene ordinarily contains minor amounts, for example, up to 10 percent, of olefinic hydrocarbons, and it is intended that the polymerization of these commercial isoprene-containing streams are included within the scope of the invention.

The high cis-polyisoprene products obtained according to the invention can range from liquids to rubbery materials. The unquenched polymer solutions can be treated with various reagents to introduce functional groups replacing the terminal lithium atoms on the polymer molecules resulting from the polymerization itself. For example, polymer in solution can be contacted with carbon dioxide to replace the lithium atoms with —COOH groups. Other functional groups which can be introduced include —SH, —OH, halogen and the like. Alternatively, the unquenched polymer solutions can be treated with an alcohol or other reagent to inactivate the catalyst or initiator and/or precipitate the polymer, which is recovered without functional groups.

The rubbery cis-polyisoprene produced in accordance with this invention can be compounded by any of the known methods such as have been used in the past for compounding rubbers. Vulcanizing agents, vulcanization accelerators, accelerator activators, reinforcing agents, antioxidants, softeners or plasticizers, and fillers and other compounding ingredients, such as have been normally employed in rubbers can likewise be used in the polymers of this invention. The rubbery diene polymers have utility in applications where both natural and synthetic rubbers are used. For example, they can be used in the manufacture of automobile tires, gaskets, and other rubber articles.

A more comprehensive understanding of the invention can be obtained by referring to the following illustrative examples which are not intended, however, to be unduly limitative of the invention. The procedures employed for evaluating the polymers in the examples are set forth following Example XII.

EXAMPLE I

A polymerization initiator was prepared by reacting lithium wire with methylnaphthalene (a 60/40 mixture of alpha- and beta-methylnaphthalenes) in the presence of diethyl ether. The following recipe was employed:

| | |
|---|---|
| Methylnaphthalene, mol | 1.0 |
| Lithium wire, gram atoms | 3.0 |
| Diethyl ether, mols | 4.5 |
| Temperature, °F. | −15 |
| Time, hours | 19 |
| Molarity [1] | 1.63 |

[1] Determined by withdrawing a portion of the reaction mixture and titrating it with 0.1 N HCl.

Ether was removed from the reaction mixture by dropping it into refined mineral oil (U.S.P. Heavy White Mineral Oil) that had been heated to 100° C. and purged with nitrogen. Thirty milliliters of the ether-containing reaction mixture was used per 125 milliliters of mineral oil. The temperature was maintained at 100° C. for one hour while agitating the mixture and passing nitrogen through it. After allowing it to cool to room temperature, it was diluted with 125 milliliters of n-pentane. The resulting mixture had a molarity of 0.165.

Variable quantities of n-butyl bromide were used in the polymerization of isoprene in the presence of the foregoing initiator dispersion. The recipe was as follows:

| | |
|---|---|
| Isoprene, parts by weight | 100 |
| n-Pentane, parts by weight | 1000 |
| Initiator, mhm.[1] | 2.5 |
| n-Butyl bromide, mhm.[1] | Variable |
| Temperature, °F. | 122 |
| Time, hours | 24 |

[1] Millimoles per 100 grams monomer.

Pentane was charged first, the reactor was purged with nitrogen, isoprene was added, and then the initiator. When butyl bromide was used, it was added last. Following are the results of a series of runs:

TABLE I

| Run No. | n-C₄H₉Br, mhm. | Li/C₄H₉Br, mol ratio | Conv., percent | Cis, percent normalized | 3,4-addition, percent normalized | Inh. (A) Visc. | Gel (B), percent |
|---|---|---|---|---|---|---|---|
| 1 | 0.63 | 8/1 | 100 | 90.4 | 9.6 | 4.46 | 0 |
| 2 | 1.25 | 4/1 | 100 | 89.9 | 10.1 | 3.59 | 0 |
| 3 | 1.88 | 2.7/1 | 100 | 89.2 | 10.8 | 3.11 | 0 |
| 4 | 2.5 | 2/1 | 100 | 89.4 | 10.6 | 2.77 | 0 |
| 5 (control) | | | 100 | 88.6 | 11.4 | 4.60 | 0 |

(A), (B)—See notes at end of specification.

The data show that butyl bromide functioned as a modifier and as the amount was increased, the inherent viscosity decreased. The polymer prepared in the presence of butyl bromide had a higher cis content and lower 3,4-addition than the control.

EXAMPLE II

The initiator described in Example I was employed for the polymerization of isoprene in accordance with the following recipe:

| | |
|---|---|
| Isoprene, parts by weight | 100 |
| n-Pentane, parts by weight | 1000 |
| Initiator, mhm. | 1.75 |
| n-Butyl bromide, mhm. | 0.87 |
| Temperature, °F. | 122 |
| Time, hours | 21 |
| Conversion, percent | 100 |
| Microstructure, percent: | |
|   Cis, normalized | 90.3 |
|   3,4-addition, normalized | 9.7 |
| Inherent viscosity (A) | 5.71 |
| Gel, percent (B) | 0 |
| ML-4 at 212° F. (C) | 71.4 |

(A), (B), (C)—See notes at end of specification.

The polymer was compounded in a tread stock recipe using two different accelerator levels. A control was run using a blend of four polymers prepared in the presence of a lithium methylnaphthalene initiator but with no butyl bromide in the system. This polymer blend had a raw Mooney value (ML-4 at 212° F.) of 51, normalized cis content of 88.6 percent and a raw 3,4-addition of 8.0 percent. All stocks were mixed, prior to addition of curatives, in a Midget Banbury for 6 minutes at 250° F. and then for 5 minutes at 290° F. Observations were made on processing properties after which curatives were added, stocks cured, and physical properties determined. Data are shown in the following table:

TABLE II
Compounding Recipes, Parts by Weight

|  | A | B | Control |
|---|---|---|---|
| Rubber | 100 | 100 | 100 |
| High abrasion furnace black | 50 | 50 | 50 |
| Zinc oxide | 3 | 3 | 3 |
| Stearic acid | 3 | 3 | 3 |
| Flexamine [1] | 1 | 1 | 1 |
| Philrich 5 [2] | 5 | 5 | 5 |
| Pepton 22 [2] | 1 | 1 | 1 |
| Sulfur | 2.25 | 2.25 | 2.25 |
| NOBS Special [4] | 0.5 | 0.7 | 0.5 |

Processing Properties

|  | A | B | Control |
|---|---|---|---|
| Compounded MS-1½ at 212° F | 25.5 | | 27.0 |
| Extrusion at 195° F.: | | | |
|   Inches/minute | 55.8 | | 57.0 |
|   Grams/minute | 114.2 | | 115.2 |
|   Rating (Garvey die) | 12− | | 12− |
| Mill banding | Good | | Good |

Physical Properties, 45 Minutes Cure at 292° F.

|  | A | B | Control |
|---|---|---|---|
| $\nu \times 10$, mols/cc. (D) | 1.51 | 1.68 | 1.51 |
| 300% Modulus, p.s.i.[5] | 1,260 | 1,460 | 1,100 |
| Tensile, p.s.i.[5] | 3,430 | 3,535 | 3,300 |
| Elongation, percent [6] | 610 | 570 | 660 |
| Max. Tensile at 200° F | 1,956 | 2,000 | 1,845 |
| ΔT, ° F. (F) | 43.3 | 40.5 | 42.6 |
| Resilience, percent (G) | 68.9 | 68.8 | 67.1 |
| Shore A Hardness (H) | 57.5 | 59.5 | 58.0 |

Oven Aged 24 Hours at 212° F.

|  | A | B | Control |
|---|---|---|---|
| 300% Modulus, p.s.i. (E) | 1,525 | 1,770 | 1,440 |
| Tensile, p.s.i. (E) | 2,000 | 1,965 | 1,610 |
| Elongation, percent (E) | 380 | 320 | 345 |
| ΔT, ° F. (F) | 45.3 | 40.5 | 45.3 |
| Resilience, percent (G) | 68.7 | 69.9 | 67.3 |
| Shore A Hardness (H) | 61.5 | 63.0 | 62.0 |

[1] Physical mixture containing 65 percent of a complex diarylamine-ketone reaction product and 35 percent of N,N′-diphenyl-p-phenylenediamine.
[2] Aromatic oil.
[3] 2,2′-dibenzamidodiphenyl disulfide.
[4] N-oxydiethylene-2-benzothiazyl sulfenamide.
[5] 30-minute cures.
[6] Stocks mixed 6 minutes in Midget Banbury at 250° F. and cured.
(D), (E), (F), (G), (H)—See notes at end of specification.

The data show that the polymers modified with butyl bromide had a better balance of properties than the control. Even though the butyl bromide modified polymer had a much higher Mooney value than the control, it was equivalent in processability.

EXAMPLE III

Lithium was reacted with methylnaphthalene in diethyl ether and the polar solvent was then replaced with mineral oil in a manner similar to that described in Example I. This initiator was used for the polymerization of isoprene. Two runs were made. n-Butyl bromide was used in one of the runs. The following polymerization recipes were employed:

|  | A | B |
|---|---|---|
| Isoprene, parts by weight | 100 | 100 |
| n-Pentane, parts by weight | 1,000 | 1,000 |
| Initiator, mhm | 0.9 | 1.2 |
| n-Butyl bromide, mhm | | 0.6 |
| Temperature, ° F | 122 | 122 |
| Time, hours | 26 | 26 |
| Conversion, percent | 100 | 100 |
| ML-4 at 212° F. (C) | 54.0 | 64.0 |
| Inherent Viscosity (A) | 5.99 | 4.37 |
| Gel, percent (B) | trace | 0 |
| Microstructure, percent: | | |
|   Cis: | | |
|     Raw | 76.6 | 81.2 |
|     Normalized | 89.9 | 91.1 |
|   3,4-addition: | | |
|     Raw | 8.6 | 7.9 |
|     Normalized | 10.1 | 8.9 |

(A), (B), (C)—See notes at end of specification.

In these runs pentane was charged first, the reactor was purged with nitrogen, isoprene was added, and then the initiator. The butyl bromide used in run B was charged last in pentane solution.

The polymers were compounded in a tread stock recipe, mixed in a Midget Banbury for 6 minutes at 250° F., and then for 5 minutes at 290° F. The stocks were cured and physical properties determined. A summary of the data is shown in the following table:

TABLE III
Compounding Recipe, Parts by Weight

|  | A (Control) | B |
|---|---|---|
| Rubber | 100 | 100 |
| High abrasion furnace black | 50 | 50 |
| Zinc oxide | 3 | 3 |
| Stearic acid | 3 | 3 |
| Flexamine | 1 | 1 |
| Philrich 5 | 5 | 5 |
| Pepton 22 | 1 | 1 |
| Sulfur | 2.25 | 2.25 |
| NOBS Special | 0.5 | 0.5 |

Processing Properties

|  | A (Control) | B |
|---|---|---|
| Compounded MS-1½ at 212° F | 33.0 | 31.5 |
| Extrusion at 195° F.: | | |
|   Inches/minute | 58.8 | 59.2 |
|   Grams/minute | 113.0 | 118.0 |
|   Rating (Garvey die) | 9+ | 11 |
| Mill banding | Good | Good |

Physical Properties, 45 Minutes Cure at 292° F.

|  | A (Control) | B |
|---|---|---|
| $\nu \times 10$, mols/cc. (D) | 1.56 | 1.53 |
| 300% Modulus, p.s.i (E) | 1,200 | 1,230 |
| Tensile, p.s.i. (E) | 2,740 | 3,270 |
| Elongation, percent (E) | 530 | 560 |
| Max. Tensile at 200° F., p.s.i | 1,750 | 2,110 |
| ΔT, ° F. (F) | 39.9 | 42.9 |
| Resilience, percent (G) | 71.6 | 69.6 |
| Shore A Hardness (H) | 56.5 | 57.5 |

Oven Aged 24 Hours at 212° F.

|  | A (Control) | B |
|---|---|---|
| 300% Modulus, p.s.i. (E) | 925 | 1,110 |
| Tensile, p.s.i. (E) | 1,050 | 1,225 |
| Elongation, percent (E) | 325 | 320 |
| ΔT, ° F. (F) | 43.9 | 46.3 |
| Resilience, percent (G) | 71.1 | 69.8 |
| Shore A Hardness (H) | 57.5 | 59.0 |

(D), (E), (F), (G), (H)—See notes at end of specification.

The data show that the polymer prepared in the presence of butyl bromide had a higher cis content and better processing properties even though it had the higher raw Mooney value. The cured stock also had a better balance of properties than the polymer prepared in the absence of butyl bromide.

EXAMPLE IV

An isoamylene dehydrogenation effluent containing 11 weight percent isoprene was employed in a series of polymerization runs using 2.2 mhm. of the lithium methylnaphthalene initiator of Example III and 1.1 mhm. of n-butyl bromide. The isoamylene dehydrogenation effluent furnished both the monomer and solvent. The isoamylene effluent had the following analysis:

TABLE IV—Effluent Analysis

Component:
  Isopentane _____Weight percent__ 0.5
  n-Pentane _____do____ 0.5
  3-methylbutene-1 _____do____ 0.4
  2-methylbutene-1 _____do____ 32.0
  2-methylbutene-2 _____do____ 55.6
  Isoprene _____do____ 11.0
  Trans-piperylene _____do____ 0.08
  Cis-piperylene _____do____ 0.01
  Cyclopentadiene _____p.p.m__ 10
  α-Acetylenes _____p.p.m__ 20

Polymerization temperature was 122° F. Products from several runs were blended to give a polymer having a raw Mooney value (ML–4 at 212° F.) of 64.1, an inherent viscosity of 5.42, normalized cis content of 88.3 percent, and normalized 3,4-addition content of 11.7 percent.

This polymer was compounded and milled as in Example III. It banded well on the mill, had a Garvey die extrusion rating of 12, and other good processing properties. The compounded stock was cured 45 minutes at 292°

F. and physical properties determined. Results were as follows:

| | |
|---|---|
| $\nu \times 10$, mols/cc. (D) | 1.43 |
| 300 percent modulus, p.s.i. | 1110 |
| Tensile, p.s.i. (E) | 3160 |
| Elongation, percent (E) | 590 |
| Max. tensile at 200° F., p.s.i. | 1725 |
| $\Delta$T, °F. (F) | 46.6 |
| Resilience, percent (G) | 67.4 |
| Shore A Hardness (H) | 56.5 |

Oven aged 24 hours at 212° F.

| | |
|---|---|
| 300% modulus, p.s.i. (E) | 1145 |
| Tensile, p.s.i. (E) | 1375 |
| Elongation, percent (E) | 350 |
| $\Delta$T, °F. (F) | 50.0 |
| Resilience, percent (G) | 67.3 |
| Shore A Hardness (H) | 57.5 |

(D), (E), (F), (G), (H)—See notes at end of specification.

These data show that the present invention is applicable for the polymerization of isoprene contained in isoamylene dehydrogenation effluent and that a polymer having a high cis content, good processing properties, and good physical properties can be obtained when operating in this manner.

EXAMPLE V

The initiator of Example III was employed for the polymerization of isoprene. Hydrogen bromide was present in the system. Two runs were made in accordance with the following recipe:

| | |
|---|---|
| Isoprene, parts by weight | 100 |
| n-Pentane, parts by weight | 1000 |
| Initiator, mhm. | Variable |
| Hydrogen bromide, mhm. | Variable |
| Temperature, °F. | 122 |
| Time, hours | 24 |

Pentane was charged first, the reactor was purged with nitrogen, isoprene and the initiator were added in that order, and hydrogen bromide was introduced as a gas. Following are the results of the runs:

| Run No. | Initiator, mhm. | HBr, mhm. | Li/HBr, mol ratio | Conv., percent | Cis, Percent | | 3,4-addition, percent | | Inh.(A) Visc. | Gel, (B) percent |
|---|---|---|---|---|---|---|---|---|---|---|
| | | | | | Raw | Normalized | Raw | Normalized | | |
| 1 | 1.0 | 0.5 | 4/1 | 85 | 84.2 | 91.7 | 7.6 | 8.3 | 5.28 | 0 |
| 2 | 1.6 | 0.8 | 4/1 | 100 | 75.0 | 89.7 | 8.6 | 10.3 | 5.38 | 0 |

(A), (B)—See notes at end of specification.

EXAMPLE VI

A lithium methylnaphthalene reaction product was prepared in diethyl ether and this solvent was then replaced with mineral oil in a manner similar to that described in Example I. This initiator was used for the polymerization of isoprene using 100 parts by weight of the monomer, 1000 parts by weight of n-pentane, and 1.5 mhm. of initiator. Polymerization was effected at 122° F. for 24 hours. Two runs were made. One was used as a control and 2.0 mhm. of bromobenzene was added last to the other run. Quantitative conversion was obtained in both runs. The following data show that a polymer of higher cis content is obtained when bromobenzene is present:

| Run No. | Initiator, mhm. | Bromobenzene, mhm. | Li/Br, mol ratio | Cis, percent normalized | 3,4-addition, percent normalized |
|---|---|---|---|---|---|
| 1 | 1.5 | 2.0 | 1.5/1 | 90.4 | 9.6 |
| 2 | 1.5 | | | 89.7 | 10.3 |

EXAMPLE VII

Three halides, n-hexyl fluoride, n-butyl chloride and n-butyl bromide were employed in a series of runs for the polymerization of isoprene using the same quantities of monomer and pentane employed in Example VI and the same initiator. Polymerization temperature was 122° F. and the time was 24 hours. The initiator level was 2 mhm. A control run was made in which no halogen adjuvant was present. All reactions reached quantitative conversion and the polymers were gel free. The following results were obtained:

| Run No. | Halide | | Li/Halide, mol ratio | Cis, percent normalized | 3,4-addition, percent normalized | Inherent (A) Viscosity |
|---|---|---|---|---|---|---|
| | Type | mhm. | | | | |
| 1 | n-Hexyl F | 2.0 | 2/1 | 90.5 | 9.5 | 4.75 |
| 2 | do | 1.0 | 4/1 | 89.0 | 11.0 | 5.24 |
| 3 | do | 0.67 | 6/1 | 89.6 | 10.4 | 5.60 |
| 4 | n-Butyl Cl | 2.0 | 2/1 | 89.8 | 10.2 | 6.01 |
| 5 | n-Butyl Br | 1.33 | 3/1 | 89.6 | 10.4 | 4.33 |
| 6 | do | 1.0 | 4/1 | 90.0 | 10.0 | 4.67 |
| 7 | do | 0.67 | 6/1 | 90.7 | 9.3 | 5.11 |
| 8 | | | | 89.7 | 10.3 | 6.08 |

(A)—See note at end of specification.

These data show that the polymers prepared in the presence of a halogen adjuvant had lower inherent viscosities than the control and in general the cis content was higher.

EXAMPLE VIII

A lithium methylnaphthalene reaction product in mineral oil was prepared as described in Example I (molarity, 0.165). To each of three bottles was added 48.5 milliliters (8 millimols) of the mineral oil dispersion. Anhydrous hydrogen chloride gas was added to one bottle, isobutyl iodide to the second bottle, and iodine dissolved in n-pentane to the third. Addition of each of the halogen-containing reagents required about 5 minutes. The following table shows quantities of the reagents used and molarity of each dispersion:

| Initiator | Reagent Added | | Molarity |
|---|---|---|---|
| | Type | Mmols | |
| 2 | HCl gas | 4.0 | 0.13 |
| 3 | Isobutyl iodide | 4.0 | 0.13 |
| 4 | Iodine | 2.0 | 0.10 |

Each of the above-described products was used as an initiator for the polymerization of isoprene. The amounts of isoprene and n-pentane were the same as in Example I. Polymerization temperature was 122° F. and reaction time was 41 hours. In each case quantitative conversion was reached and all polymers were gel free. Results are summarized in the following table:

| Run No. | Initiator No. | Initiator, mhm. | Cis, percent | | 3,4-addition, percent | | Inherent (A) Viscosity |
|---|---|---|---|---|---|---|---|
| | | | Raw | Normalized | Raw | Normalized | |
| 1 | 2 | 2.50 | 81.2 | 90.4 | 8.6 | 9.6 | 4.22 |
| 2 | 3 | 2.00 | 73.5 | 87.8 | 10.4 | 12.4 | 2.32 |
| 3 | 4 | 2.25 | 82.7 | 90.0 | 9.2 | 10.0 | 4.32 |

(A)—See note at end of specification.

These data show that good results can be obtained if the halogen-containing reagent is added to the organolithium initiator prior to charging it to the polymerization system.

EXAMPLE IX

Lithium wire was reacted with methylnaphthalene using the proportions of ingredients given in Example I. The reaction was effected at −15° F. for 18 hours. Molarity of the reaction mixture, determined by 0.1 N hydrochloric acid titration, was 1.80.

Twenty-seven millimols of n-butyl bromide was added to 15 milliliters of the lithium methylnaphthalene reaction mixture at 0° C. The temperature was maintained at 41° F. (5° C.) for 1 hour after which ether was removed by adding the mixture to 100 milliliters of refined mineral oil (U.S.P. Heavy White Mineral Oil) which had been heated to 100° C. and purged with nitrogen. The temperature was maintained at 100° C. for 1 hour while agitating the mixture and passing nitrogen through it. It was then allowed to cool to room temperature. The molarity was 0.085.

The foregoing initiator was used for the polymerization of isoprene in n-pentane. The quantities of isoprene and n-pentane were the same as in Example I. The initiator level was 5.0 mhm. Polymerization was effected at 122° F. and quantitative conversion was reached after 22 hours. The product had an inherent viscosity of 3.25 (A), raw cis content of 80.4 percent (normalized, 89.4), and raw 3,4-addition of 9.6 percent (normalized, 10.6).

EXAMPLE X

Dilithium dihydroanthracene was prepared by reacting 0.11 mol of n-butyllithium with 0.05 mol of dihydroanthracene in 100 milliliters of toluene. The mixture was placed in a nitrogen atmosphere. A solid product formed which was separated by centrifuging the mixture. It was washed with 50 milliliters of toluene and followed by two washings with n-pentane, each time centrifuging and decanting the liquid. Unreacted butyllithium was removed by the washing steps. The solid product was finally dispersed in 100 milliliters of n-pentane. The dispersion had a molarity of 0.306.

The above-described dilithium dihydroanthracene was employed as the initiator in two runs for the polymerization of isoprene. n-Butyl bromide was used in one run. Recipes and data are shown below:

| | Run A | Run B |
|---|---|---|
| Isoprene, parts by weight | 100 | 100 |
| n-Pentane, parts by weight | 1,000 | 1,000 |
| Initiator, mhm | 5 | 5 |
| n-Butyl bromide, mhm | 0.5 | |
| Temperature, °F | 122 | 122 |
| Time, hours | 18 | 72 |
| Conversion, percent | 100 | 100 |
| Inherent viscosity (A) | 5.02 | 6.53 |
| Microstructure, percent: | | |
| Cis: | | |
| Raw | 90.4 | 90.4 |
| Normalized | 92.1 | 91.1 |
| 3,4-addition: | | |
| Raw | 7.8 | 8.8 |
| Normalized | 7.9 | 8.9 |

(A)—See note at end of specification.

The run in which butyl bromide was used gave a polymer with a lower inherent viscosity and a slightly higher cis content than the control run.

EXAMPLE XI

Normal butyl bromide was employed in the polymerization of butadiene using as the initiator a lithium methylnaphthalene reaction product prepared in a manner similar to that described in Example I. A control run was made in the absence of butyl bromide. The polymerization recipe was as follows:

| | |
|---|---|
| 1,3-butadiene, parts by weight | 100 |
| Cyclohexane, parts by weight | 780 |
| Initiator, mhm. | 2.0 |
| n-Butyl bromide, mhm. | Variable |
| Temperature, °F. | 122 |
| Time, hours | 6 |

Cyclohexane was charged first, the reactor was urged with nitrogen, and butadiene, initiator, and butyl bromide were added in the order named. Results were as follows:

| Initiator, mhm. | BuBr, mhm. | Li/BuBr, mol ratio | Conv., percent | Inh. Visc. | Microstructure, percent | | |
|---|---|---|---|---|---|---|---|
| | | | | | Cis | Trans | Vinyl |
| 2.0 | | | 100 | 1.81 | 43.0 | 50.0 | 7.0 |
| 2.0 | 1.0 | 4/1 | 98 | 2.12 | 44.7 | 48.1 | 7.2 |
| 2.0 | 2.0 | 2/1 | 98 | 2.14 | 50.6 | 42.4 | 7.0 |

The reactions were terminated with isopropyl alcohol containing one weight percent, based on the polymer, of 2,2'-methylene-bis(4-methyl - 6 - tert-butylphenol). The polymers were coagulated in isopropyl alcohol and dried.

These data show that the cis content increased with an increase in the butyl bromide. Polymers prepared in the presence of butyl bromide had better milling characteristics than the control.

EXAMPLE XII

Runs were made at 122° F. to determine the effect of butyl bromide and bromobenzene as halogen adjuvants when polymerizing isoprene in the presence of butyllithium. The polymerization recipe was as follows:

| | |
|---|---|
| Isoprene, parts by weight | 100 |
| n-Pentane, parts by weight | 1,000 |
| n-Butyllithium, mhm. | 1.5 or 2.0 |
| Halogen adjuvant, mhm. | Variable |

The diluent was charged first and the reactor was purged with nitrogen after which the butyllithium and the halogen adjuvant were added. The temperature was adjusted to 122° F. and maintained at this level for variable periods before addition of the isoprene. At the conclusion of each polymerization, approximately one part by weight per 100 parts by weight of polymer of 2,2'-methylene-bis(4-methyl-6-tert-butylphenol) was added. The polymer was coagulated in isopropyl alcohol and dried overnight in a vacuum oven. Results were as follows:

| Run No. | BuLi, mhm. | Halogen Adjuvant | | Hours at 122° F. Before Adding Isoprene | Polymerization Time, hours | Conv., Percent | Microstructure, Percent | | Inherent Viscosity |
|---|---|---|---|---|---|---|---|---|---|
| | | Type | mhm. | | | | Cis | 3,4-addition | |
| 1 | 2.0 | -------- | 0 | 0 | 24.9 | 97 | 73.5 | 10.2 | 1.44 |
| 2 | 2.0 | BuBr | 1.0 | 1.0 | 23.9 | 96 | 72.0 | 10.3 | 1.98 |
| 3 | 2.0 | BuBr | 1.0 | 2.0 | 22.9 | 97 | 72.0 | 9.8 | 2.40 |
| 4 | 2.0 | BuBr | 1.0 | 5.0 | 19.9 | 95 | 72.0 | 9.4 | 2.31 |
| 5 | 2.0 | BuBr | 0.5 | 1.0 | 23.9 | 98 | 72.0 | 10.2 | 2.42 |
| 6 | 2.0 | BuBr | 0.5 | 2.0 | 22.9 | 99 | 72.0 | 10.3 | 2.18 |
| 7 | 2.0 | BuBr | 0.5 | 5.0 | 19.9 | 91 | 78.1 | 9.0 | 3.18 |
| 8 | 1.5 | -------- | 0 | 1.1 | 15 | 99 | 72.0 | 11.3 | 1.72 |
| 9 | 1.5 | BuBr | 3.0 | 1.1 | 15 | 100 | 73.5 | 10.6 | 2.31 |
| 10 | 1.5 | BuBr | 1.5 | 1.1 | 15 | 98 | 75.0 | 10.9 | 2.07 |
| 11 | 1.5 | φBr | 4.0 | 1.1 | 15 | 100 | 75.0 | 10.8 | 2.05 |
| 12 | 1.5 | φBr | 2.0 | 1.1 | 15 | 100 | 72.0 | 10.8 | 1.92 |

These data show that inherent viscosity of the polyisoprene increased in the presence of the halogen adjuvant when the butyllithium initiator was employed, this indicating that no modification occurs with an alkyllithium initiator.

All reactions in the preceding examples were effected in an inert atmosphere.

Microstructures in the above examples were determined using a commercial infrared spectrometer. The samples were dissolved in carbon disulfide so as to form a solution containing 25 grams of polymer per liter of solution. Calibrations were based on deproteinized natural rubber as a reference material assuming that it contained 98 percent cis and 2 percent 3,4-addition product. The cis was measured at the 8.9 micron band and 3,4-addition at the 11.25 micron band. In the presence of a high cis polyisoprene, trans is not detectable, since trans is measured at the 8.75 micron band. The raw cis and raw 3,4-addition are converted to normalized values (assuming cis+3,4-addition=100) as follows:

$$\frac{\text{Raw cis (percent)}}{\text{Raw cis (percent)} + \text{raw 3,4-addition (percent)}} (100)$$
$$= \text{normalized cis (percent)}$$

$$\frac{\text{Raw 3,4-addition (percent)}}{\text{Raw cis (percent)} + \text{raw 3, 4-addition (percent)}} (100)$$
$$= \text{normalized 3,4-addition (percent)}$$

NOTES (A) One-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filtered through a sulfur absorption tube of grade C porosity to remove any solid particles present. The resulting solution was run through a Medalia-type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample.

(B) Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, two-ounce bottle. A piece of folded quarter-inch hardware cloth in the bottom of the bottle supported the cage with minimum contact. The bottle containing the cage was weighed to the nearest 0.02 gram during a minimum three-minute draining period after which the cage was withdrawn and the bottle again weighed to the nearest 0.02 gram. The difference in the two weighings is the weight of the cage plus the toluene retained by it, and by subtracting the weight of the empty cage from this value, the weight of toluene retention is found, i.e. the cage calibration. In the gel determination, after the cage containing the sample had stood for 24 hours in toluene, the cage was withdrawn from the bottle with the aid of forceps and placed in the two-ounce bottle. The same procedure was followed for determining the weight of swelled gel as was used for calibration of the cage. The weight of swelled gel was corrected by subtracting the cage calibration.

(C) ASTM D 927–55T.

(D) Swelling method of Kraus, Rubber World 135, 67–73, 254–260 (1956). This value is the number of network chains per unit volume of rubber. The higher the number, the more the rubber is cross-linked (vulcanized).

(E) ASTM D 412–51T. Scott Tensile Machine L–6. Tests made at 80° F.

(F) ASTM D 623–58, Method A. Goodrich Flexometer, 143 lbs./sq. inch load, 0.175 inch stroke. Test specimen is a right circular cylinder 0.7 inch in diameter and one inch high.

(G) ASTM D 945–55 (modified). Yerzley oscillograph. Test specimen is a right circular cylinder 0.7 inch in diameter and one inch high.

(H) ASTM D 676–55T. Shore Durometer, Type A.

It will be evident to those skilled in the art that many variations and modifications can be practiced upon consideration of the foregoing disclosure. Such variations and modifications are believed to be within the spirit and scope of the present invention.

I claim:

1. An active catalyst composition formed on mixing (a) an organolithium compound formed by reacting lithium with a material selected from the group consisting of polycyclic aromatic compounds and polyaryl substituted ethylenes containing from 2 to 4 aryl groups selected from the group consisting of phenyl and naphthyl and (b) a halogen compound having the formula $X_2$ where X is halogen, the ratio of the amount of component (a) to component (b) being in the range of 0.25 to 20 gram atoms of lithium per gram atom of halogen.

2. The composition according to claim 1 wherein said halogen is iodine.

3. The composition according to claim 1 wherein said organolithium compound is formed by reacting lithium with at least one of a group consisting of dihydroanthracene and methylnaphthalene.

4. An active catalyst composition formed on mixing (a) an organolithium compound formed from an organo material selected from the group consisting of polycyclic aromatic compounds, halogen derivatives of polycyclic aromatics containing from 2 to 4 halogen atoms per molecule, polyaryl substituted ethylenes and bihalogen-containing polyaryl substituted ethanes containing from 2 to 4 aryl groups selected from the group consisting of phenyl and naphthyl and (b) a halogen adjuvant comprising an organic halogen compound wherein the organic radical is at least one selected from the group consisting of saturated aliphatic, saturated cycloaliphatic and aromatic radicals, the ratio of the amount of component (a) to component (b) being in the range of 0.25 to 20 gram atoms of lithium per gram atom of halogen.

5. The catalyst composition according to claim 4 wherein component (a) is an organolithium compound formed by reacting a material selected from the group consisting of lithium and organolithium compounds with a material selected from the group consisting of polycyclic aromatic compounds, halogen derivatives of polycyclic aromatics containing from 2 to 4 halogen atoms per molecule, polyaryl substituted ethylenes and bihalogen-containing polyaryl substituted ethanes containing from 2 to 4 aryl groups selected from the group consisting of phenyl and naphthyl, and wherein in component (b) said organic radical is selected from the group consisting of saturated aliphatic, saturated cycloaliphatic, and aromatic radicals containing from 1 to 12 carbon atoms, inclusive.

6. A catalyst composition according to claim 5 wherein said organo halide is n-butyl bromide.

References Cited

UNITED STATES PATENTS

| | | | |
|---|---|---|---|
| 2,920,066 | 1/1960 | Nowlin et al. | 260—94.3 |
| 2,938,020 | 5/1960 | Matlack | 260—94.3 |
| 2,959,576 | 11/1960 | Payne | 260—94.3 |
| 3,048,568 | 8/1962 | Cleary | 260—665 |
| 3,082,264 | 3/1963 | West et al. | 260—665 |
| 3,097,108 | 7/1963 | Bosmajian | 260—94.2 |
| 3,193,590 | 7/1965 | Hsieh | 260—665 |
| 3,331,826 | 7/1967 | Talcott | 260—94.2 |

FOREIGN PATENTS 817,695  8/1959  Great Britain.

DANIEL E. WYMAN, *Primary Examiner.*

P. E. KONOPKA, *Assistant Examiner.*

U.S. Cl. X.R.

252—429; 260—82.1, 82.3, 83.5, 83.7, 85.3, 91.1, 91.5, 94.2, 665